Patented Nov. 2, 1948

2,453,070

UNITED STATES PATENT OFFICE 2,453,070

ORGANIC PEROXIDE COMPOSITION

Harlow G. Hyatt, Buffalo, and Edward S. Shanley, Kenmore, N. Y., assignors to Buffalo Electro-Chemical Company, Inc., Tonawanda, N. Y.

No Drawing. Application August 23, 1944, Serial No. 550,846

10 Claims. (Cl. 260—610)

The present invention relates to organic peroxides and particularly to solid organic peroxides that have been desensitized with respect to mechanical and thermal shock and to a method of producing such desensitized peroxides.

Organic peroxides possess valuable properties which render them eminently suitable for use in many bleaching operations, for instance, in flour bleaching. These compounds are also of great technical interest in the preparation of synthetic resins, where they are used to induce the formation of polymers from monomers. In spite of the many valuable properties of these materials, the inherent shock sensitivity and tendency to detonate on impact, has greatly hindered commercial utilization. In fact, only one solid organic peroxide, namely, benzoyl peroxide, has attained any measure of commercial acceptance. The use of even this has been greatly restricted by the inherent instability, particularly the tendency to detonate upon impact and to burn at an extremely rapid rate when ignited.

Other solid peroxides having interesting properties, such as acetyl benzoyl peroxide, maleic benzoyl peroxide, crotonyl peroxide, dioxy dimethyl peroxide, and many others, have been prepared and studied by several workers. Commercial use has never been made of these materials, however, because of the inherent fire and explosion danger from these unstable compounds.

Many attempts have been made to control and regulate this sensitivity of solid organic peroxides. Particular attention has been paid to benzoyl peroxide in the prior art. Substantially all proposals depend upon dilution of the peroxide for their effectiveness. Generally, inorganic loading or extending materials such as calcium sulfate, magnesium phosphate, calcium phosphate and the like have been used to this end, and the amounts of such materials were relatively large in proportion to the amount of benzoyl peroxide to be desensitized. Thus these inorganic materials have been employed in quantities from 2 to 6 times the weight of the benzoyl peroxide in the mixture. See, for example, U. S. Patent No. 2,335,856 to F. H. Penn, and 1,631,903 to J. A. L. Van der Lande. Benzoyl peroxide so treated is relatively safe to handle and transport and for certain purposes, as for instance flour bleaching, the presence of such extenders has not injuriously affected the use of the benzoyl peroxide. Obviously, however, the presence of such large amounts of these inert extenders has eliminated the employment of such mixtures in many other chemical reactions where peroxides possess eminent suitability as, for instance, the addition thereof to resinous materials and their monomers.

Another means for circumventing the sensitivity of peroxides has been to wet them with water. Thus, the Bureau of Explosives' regulations for the shipment of pure, powdered benzoyl peroxide specifies that the material shall be wet with 30% of its own weight of water. By the employment of such means the sensitivity of benzoyl peroxide to shock detonation and to ignition is effectively reduced but many technical difficulties arise by the employment of this desensitizing procedure. For instance, such a wet paste is incompatible with substantially all resin monomers and, hence, the paste is of no value as a polymerization catalyst. Furthermore, the wet paste cannot be employed practically in flour bleaching technology as it cannot be dispersed uniformly in the flour. Although dry peroxides may be obtained from the wet paste by evaporation of the desensitizing water, such drying is particularly hazardous and the dry powdered end product must finally be handled in its most hazardous and difficult form.

It is a purpose of the present invention to provide dry, powdered, organic peroxides that have been rendered stable to impact and which are relatively slow burning by the addition of innocuous stabilizing and desensitizing agents in amounts relatively small as compared with the amount of peroxide rendered stable.

It is a further object of the invention to provide dry powdered desensitized organic peroxides that can be employed in substantially all fields of use where organic peroxides alone find application and particularly a desensitized benzoyl peroxide which is eminently suitable for use as a polymerization catalyst.

In accordance with the practice of the present invention, a relatively small amount of an organic acid is incorporated into the peroxide. The resulting mixture is similar in appearance and in chemical properties to the peroxide not containing added acid except that the resultant treated peroxide possesses a greatly reduced burning rate and greatly decreased sensitivity to impact.

The amount of acid required to achieve this desirable result is so small that it can be ignored for substantially all purposes for which solid organic peroxides are employed. The amount of acid required may vary from about 2% to 10% or more, based on the weight of the peroxide in contrast with the 200 to 500% of inorganic stabilizer of the prior art.

The acid may be incorporated with the peroxide in substantially any fashion whatsoever provided, however, that due precautions are taken to obtain a relatively uniform dispersion of the acid with the powdered peroxide. The acid may be added to the peroxide at the time of its manufacture or subsequent thereto. The acid, if solid, may be precipitated from solution upon the peroxide and from solvents in which the acid is soluble or from water solutions of soluble salts of the acid; for instance, by acidification thereof. The resultant product is perfectly suitable as a polymerization catalyst particularly for addition to monomers of the vinyl type. Furthermore, the resultant peroxide mixture may be employed in other technical fields such as that of food processing, including the bleaching of oils and the treatment of flour.

The following examples are given merely as illustrative of the principles of the invention and are not to be deemed as limitative thereof:

EXAMPLE I 14 g. of lauric acid was added to 281 g. of benzoyl chloride. The resulting clear solution was reacted with sodium peroxide solution and water, the sodium peroxide being present in sufficient amounts to produce benzoyl peroxide by reaction with the benzoyl chloride and to provide sufficient alkali in the solution to effect such reaction. When the reaction was complete, the mixture was acidified with sulfuric acid to insure precipitation of the lauric acid. The solid benzoyl peroxide with entrained and admixed fatty acid was filtered from the spent liquor, washed with water and dried. It will be understood that the fatty acid may be dissolved in the alkaline peroxide with the formation of fatty acid soap and the reaction carried out as described. The end product from the above reaction was analyzed and the fatty acid content found to be 5%.

EXAMPLE II 281 g. of benzoyl chloride was reacted under suitable conditions with an excess of sodium peroxide solution. To the resulting slurry of benzoyl peroxide was added 14 g. of the sodium salts of a mixture of fatty acids, in form of a commercial soap (P. and G. Amber Flakes). The alkaline, aqueous slurry was acidified with dilute sulfuric acid to precipitate the fatty acids on the insoluble benzoyl peroxide. The precipitated mixture was filtered, washed with water, and dried. The product was analyzed and found to be 92.5% benzoyl peroxide.

This sample of benzoyl peroxide was subjected to impact sensitivity tests and to burning rate tests. The sample so tested possessed an active oxygen content of 6.1%, indicating a purity of 92.5%. For purposes of comparison, a sample of commercially pure benzoyl peroxide, 6.4% active oxygen, was also subjected to test as were samples of benzoyl peroxide extended and diluted with some of the desensitizers suggested in the prior art. For this purpose, samples of benzoyl peroxide were each separately desensitized with calcium phosphate, magnesium phosphate and calcium sulfate, the extenders being used in the same quantity as the fatty acid; namely, 5%. The impact tests were carried out in a manner similar to that described as the standard test in the Bureau of Mines Bulletin, Number 346, relating to testing of explosives in a falling weight type of tester. The results of the test are incorporated in the table below, which show the number of explosions in 10 trials by impact of the indicated amount of energy:

Table I

| Energy of Falling Weight Kg. Cm. | Commercially pure Benzoyl Peroxide | Benzoyl Peroxide desensitized according to present invention 6.1% Act. Oxygen | Commercially Pure Benzoyl Peroxide Diluted to 6.1% Act. Oxygen with— | | |
|---|---|---|---|---|---|
| | | | Calcium Phosphate | Magnesium Phosphate | Calcium Sulfate |
| 20 | 1 | 0 | 1 | 2 | 3 |
| 40 | 6 | 0 | 2 | 5 | 8 |
| 60 | 8 | 0 | 5 | 7 | 9 |
| 80 | 10 | 0 | 7 | 10 | 10 |
| 100 | 10 | 0 | 10 | 10 | 10 |

Burning rate tests were conducted in an apparatus which timed by electrical means the interval required for a flame to travel through a train of peroxide 36" long:

Table II

SECONDS FOR FLAME TO TRAVEL 1 YARD

| Sample | Average of 3 trials |
|---|---|
| Commercially pure 6.4% active oxygen | 2.3 |
| Desensitized according to present invention 6.1% active oxygen | 7.0 |
| Commercially pure Diluted to 6.1% active oxygen with Magnesium phosphate | 2.7 |
| Diluted to 6.1% active oxygen with Calcium sulfate | 3.0 |

As shown by the above data, the composition of the present invention exhibits a remarkably decreased sensitivity to impact and a greatly lowered rate of flame propagation, as compared with commercially pure benzoyl peroxide, or with commercially pure benzoyl peroxide diluted to the same extent with the materials described in the prior art.

EXAMPLE III 20 g. of benzoyl peroxide, in the form of a fine powder, was suspended in 100 ml. of water to which had been added 1 g. of phthalic acid and 2 g. of sodium hydroxide. The suspension was stirred for some time, then acidified with dilute sulfuric acid. The peroxide, together with the precipitated acid, was filtered off and air dried. Impact sensitivity tests were carried out in a Bureau of Mines type impact tester at 80 kilo cm., at which energy commercial benzoyl peroxide fires at every trial. The material containing 5% of phthalic acid was found to fire, at this energy, in four trials out of ten.

EXAMPLE IV

A 20 g. sample of benzoyl peroxide was treated exactly as described under Example III, except that salicylic acid was substituted for the phthalic acid. The resulting desensitized benzoyl peroxide fired in only three out of ten trials at 80 kilo cm.

EXAMPLE V

A quantity of crotonyl peroxide was prepared by reacting crotonyl chloride with an excess of sodium peroxide solution. The solid peroxide was filtered from the reaction mixture, washed and dried. A portion of the sample was suspended in water containing 10% of soap, based on the weight of peroxide. The slurry was agitated for some time, acidified with dilute sulfuric acid, and then filtered. The peroxide, together with the precipitated fatty acids, was water washed and air dried. The dried material was tested in the Bureau of Mines type impact machine with results as tabulated below.

NUMBER OF FIRES IN 10 TRIALS

| Impact Kilo, cm. | Untreated Peroxide 8.4% active Oxygen | Peroxide diluted with Sodium Carbonate 6.4% act. O. | Peroxide containing 10% fatty acid 7.4% act. O. ex. V |
|---|---|---|---|
| 20 | 6 | 6 | 0 |
| 25 | 8 | 8 | 0 |
| 30 | 10 | 10 | 0 |
| 40 | 10 | 10 | 0 |
| 50 | 10 | 10 | 1 |

The data indicate the remarkable effectiveness of the procedure of the present invention on a peroxide of high sensitivity.

EXAMPLE VI

A sample of adipic benzoyl peroxide was prepared by reacting a mixture of two moles benzoyl chloride and one mole adipic chloride, with an excess of sodium peroxide solution. The washed and dried solid peroxide was found to contain 7.6% active oxygen. Some of this material was desensitized by treating it with a soap solution and then acidifying, to precipitate the fatty acids. This washed and dried material was found to contain 7.2% active oxygen, indicating the presence of 5% of acid. Tests in the Bureau of Mines Impact Tester gave the following results:

NUMBER OF FIRES IN 10 TRIALS

| Energy of Falling Weight, Kg. Cm. | Untreated Adipic Benzoyl Peroxide | Desensitized Adipic Benzoyl Peroxide—5% Fatty Acid |
|---|---|---|
| 20 | | 0 |
| 30 | 1 | 0 |
| 40 | 4 | 0 |
| 50 | 9 | 0 |
| 60 | | 4 |

The above procedure finds general application for desensitizing organic peroxides that are solid at room temperature. Although relatively water insoluble organic acids generally are suitable as the desensitizing agent, the solid water insoluble fatty acids find particular application by reason of the ease with which such acids can be uniformly incorporated in the solid peroxide while the latter is still wet or suspended in solution.

The present invention deals with the desensitizing of organic peroxides with organic acids, while Serial No. 574,971, filed January 27, 1945 deals with desensitizing organic peroxides by precipitating desensitizing agents generally thereupon.

What is claimed is:

1. A solid organic peroxide desensitized against mechanical and thermal shock by addition thereto of 2 to 10% of a relatively water insoluble aliphatic fatty carboxylic acid.

2. The method of desensitizing a solid organic peroxide against mechanical and thermal shock which comprises precipitating upon the peroxide from 2 to 10% of a relatively water insoluble aliphatic fatty carboxylic acid.

3. Benzoyl peroxide desensitized against mechanical and thermal shock by addition thereto of 2 to 10% of a relatively water insoluble carboxylic aliphatic fatty acid.

4. Crotonyl peroxide desensitized against mechanical and thermal shock by addition thereto of 2 to 10% of a relatively water insoluble aliphatic fatty carboxylic acid.

5. Adipic benzoyl peroxide desensitized against mechanical and thermal shock by addition thereto of 2 to 10% of a relatively water insoluble aliphatic fatty carboxylic acid.

6. Benzoyl peroxide desensitized against mechanical and thermal shock by addition thereto of 2 to 10% of a relatively water insoluble aliphatic fatty carboxylic acid.

7. The method of desensitizing a solid organic peroxide against mechanical and thermal shock which comprises mixing the solid peroxide in suspension with a solution of a soluble salt of a relatively water-insoluble aliphatic fatty carboxylic acid, precipitating from 2 to 10% of the acid upon the solid peroxide and thereafter removing the mixture of peroxide and precipitated acid and drying the same.

8. The method of desensitizing benzoyl peroxide against mechanical and thermal shock which comprises mixing the solid peroxide in suspension with a solution of a soluble salt of a relatively water-insoluble aliphatic fatty carboxylic acid, precipitating from 2 to 10% of the acid upon the solid peroxide and thereafter removing the mixture of peroxide and precipitated acid and drying the same.

9. The method of desensitizing benzoyl peroxide against mechanical and thermal shock which comprises mixing the peroxide in suspension with a solution of a soluble salt of lauric acid, precipitating from 2 to 10% of the acid upon the solid peroxide and thereafter removing the mixture of peroxide and precipitated acid and drying the same.

10. The method of desensitizing benzoyl peroxide against mechanical and thermal shock which comprises suspending the peroxide in a solution of a water-soluble soap of lauric acid, acidifying the suspension to precipitate lauric acid upon the solid peroxide in an amount equivalent to 2 to 10% of the weight of the peroxide and thereafter removing the mixture of peroxide and precipitated lauric acid and drying the same.

HARLOW G. HYATT.
EDWARD S. SHANLEY.

REFERENCES CITED

The following references are of record in the file of this patent:

UNITED STATES PATENTS

| Number | Name | Date |
|---|---|---|
| 1,754,914 | Stoddard | Apr. 15, 1930 |
| 2,132,588 | Straub | Oct. 11, 1938 |

FOREIGN PATENTS

| Number | Country | Date |
|---|---|---|
| 479,912 | Great Britain | Feb. 14, 1938 |

Certificate of Correction

Patent No. 2,453,070.    November 2, 1948.

HARLOW G. HYATT ET AL.

It is hereby certified that errors appear in the printed specification of the above numbered patent requiring correction as follows:

Column 6, line 9, claim 3, before the word "acid" strike out "aliphatic fatty" and insert the same in line 8, same claim, before the word "carboxylic";

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*